B. F. MILLER.
LAMP CORD REEL.
APPLICATION FILED SEPT. 14, 1910.
1,027,663.
Patented May 28, 1912.
2 SHEETS—SHEET 2.
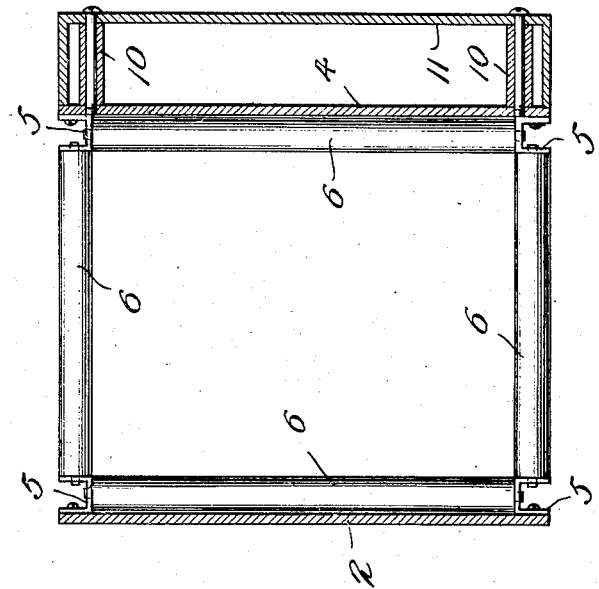
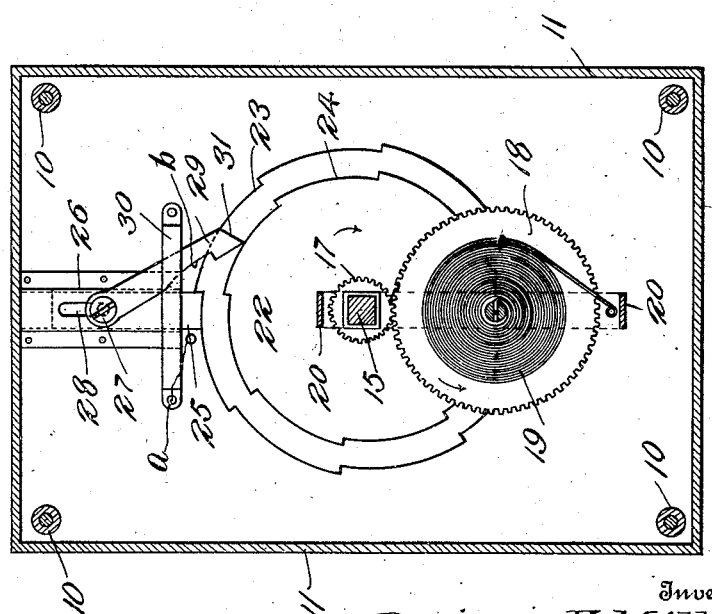
Witnesses
Frank B. Hoffman
Inventor
Benjamin F. Miller
By Victor J. Evans
Attorney

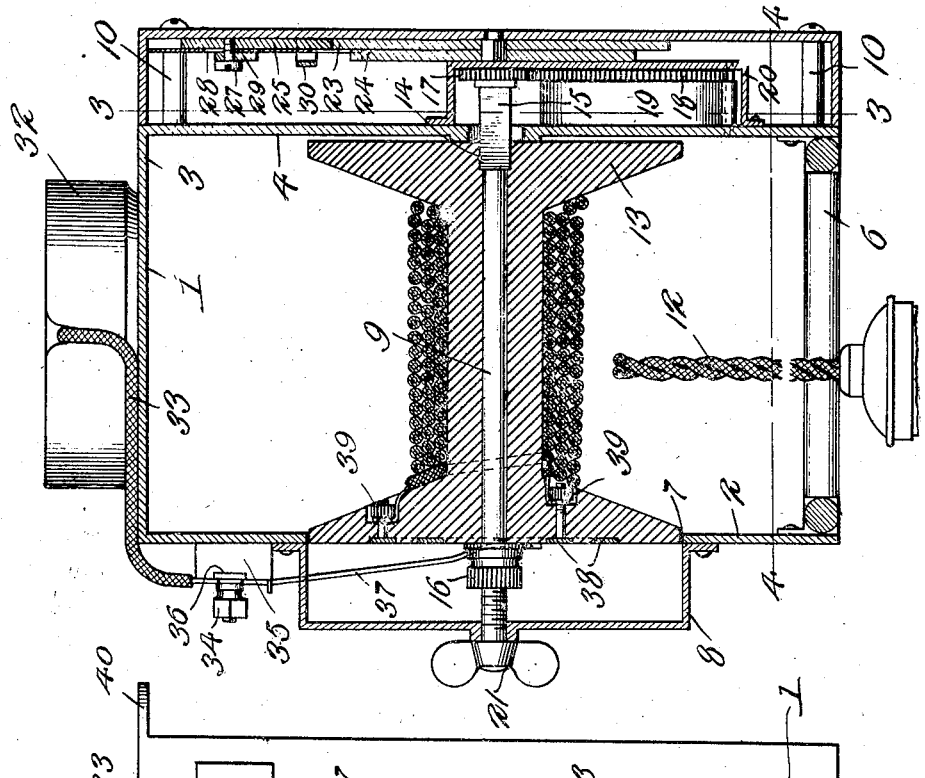

UNITED STATES PATENT OFFICE.

BENJAMIN F. MILLER, OF ULYSSES, IDAHO.

LAMP-CORD REEL.

1,027,663.  Specification of Letters Patent.  Patented May 28, 1912.

Application filed September 14, 1910. Serial No. 582,040.

*To all whom it may concern:*

Be it known that I, BENJAMIN FRANKLIN MILLER, a citizen of the United States, residing at Ulysses, in the county of Lemhi and State of Idaho, have invented new and useful Improvements in Lamp-Cord Reels, of which the following is a specification.

This invention relates to lamp cord reels and one of the principal objects of the invention is the provision of a device of this character wherein the entire lamp cord is wound upon the reel and receives its current through collector rings upon the reel which is carried by the supporting box of frame.

A further object of the invention is the provision of a spring operated reel whose normal tendency is to wind up the lamp cord and means whereby the tension of the spring may be increased or decreased as desired without operating the reel.

A further object of the invention is the provision of a novel ratchet mechanism and a trip therefor so that the drum may be absolutely under the control of the operator and be held at all times in properly adjusted position.

A still further object of the invention is the provision of means carried by the reel supporting frame for preventing friction upon the cord and the consequent wear of the insulation thereon.

Further objects of the invention will appear as the following specific description is read in connection with the accompanying drawings which form a part of this application, and in which:

Figure 1 is a front elevation. Fig. 2 is a vertical section on the line 2—2 of Fig. 1. Fig. 3 is a similar section on the line 3—3 of Fig. 2. Fig. 4 is a horizontal section on the line 4—4 of Fig. 2.

Referring more particularly to the drawings 1 represents the reel supporting frame which comprises a single piece of material forming the front plate 2, the top plate 3 and the rear plate 4. This frame is connected at its bottom by a plurality of brackets 5 arranged at each corner of the top and bottom plates and by a series of rollers 6 which prevent friction upon the lamp cord as will hereinafter be described. The front plate 2 is provided with a central aperture 7 and bridged across the front of this aperture is a bearing bracket or yoke 8 in which the forward end of the reel shaft 9 is journaled. Secured to the rear plate 4 and spaced therefrom by sleeves 10 is a rear casing 11 in which the rear end of the shaft 9 is journaled.

The reel or drum which supports the lamp cord 12 is shown at 13 and is preferably constructed of wood or other suitable insulating material and is provided with a squared socket 14 in the rear end thereof to receive the squared portion 15 of the shaft by which these parts are locked together. The forward end of the shaft is threaded and mounted upon the threaded portion is a set nut 16 which normally holds the drum in position with the squared portion 15, of the shaft 9 in the socket 14. This causes the drum or reel to rotate with the shaft when the reel is wound up and the shaft to rotate with the reel when the cord is unwound therefrom. Keyed to the squared portion 15 of the shaft is a toothed pinion 17 which meshes with the gear 18 carried upon the spring 19 which is mounted within a supporting bracket 20 carried by the rear plate 4, within the casing 11. When the reel is unwound, the pinion 17 acts upon the gear 18 to wind up the spring and when the ratchet mechanism to be hereinafter described is released, the spring 19 will act upon the shaft 9 through the gears 17 and 18 to wind up the reel. By loosening the said nut 16, and forcing the drum forwardly so as to release the squared portion 15 of the shaft from the squared socket, the shaft 9 may be rotated independently of the drum and thus the tension of the spring 19 may be either increased or decreased as desired. To accomplish this, a winged nut 21 is secured to the front end of the shaft 9.

Keyed to the shaft 9 between the rear portion of the casing 11 and the supporting bracket 20 is a ratchet wheel 22 having separate ratchet surfaces 23 and 24 which are relatively movable the latter of which is of considerably smaller circumference than the former. The ratchet surface 23 is adapted to be engaged by a locking pawl 25 slidably mounted in the casing 26 secured to the rear plate of the casing 11. This pawl carries a projecting stud 27 which operates in a slot 28 in the casing 26 and pivotally supports a releasing pawl 29 which is adapted to engage the ratchet surface 24 and is held in position and prevented from disengagement with said ratchet surface by a bracket 30 which extends across the same and across the casing 26. When one of the teeth in the ratchet surface 23 engages the locking pawl 25 the drum is prevented from winding up and by giving a slight pull upon the lamp cord and releasing the tooth from the locking pawl 25 and permitting the releasing pawl 29 to engage a tooth in the ratchet surface 24 and then releasing the tension of the lamp cord, the drum will rotate under the influence of the spring and the releasing pawl 29 will raise the locking pawl 25 out of operative position and permit the teeth of the ratchet surface 23 to ride past the same. In order that the locking pawl may be kept out of operative engagement with the teeth on the ratchet surface 23, the lower end of the releasing pawl 29 is beveled as shown at 31 so as to permit the teeth to ride idly past the same when it is in vertical position. I provide a stop $a$ to prevent the pawl or dog 29 from moving beyond the perpendicular toward the left. The pawl 29 is provided with a recess $b$ which enables it to slip up and down more freely.

Mounted upon the top of the plate 1 is a suitable rosette 32 which may be connected to a ceiling socket and which has the feed leads 33 extending therefrom to the terminal posts 34 which are mounted upon the porcelain insulators 35 carried by the front plate. Electrically connected to the terminal posts 34 by means of contact strips 36 are brush springs 37 which bear upon suitable collector rings 38 carried by the reel 13 and connected to the cord 12 by binding posts 39. This form of supporting the frame and connecting the current to the reel may be dispensed with and the frame secured to the ceiling or any suitable support by fastening devices which pass through lateral ears 40 formed upon the frame. In this instance the rosettes would be dispensed with and the lead wires 33 would be connected thereafter with the supply wires instead of being connected through a rosette or ceiling socket.

Having thus described the invention, what is claimed is—

1. In combination, a spring-operated reel shaft, a reel mounted thereon, a double face ratchet connected to the shaft, means engaging one face of the ratchet for locking it against movement by the spring, and means pivoted on said locking means and operated by the other face of the ratchet to hold the locking means in inoperative position.

2. In combination, a spring rotated shaft, a double face ratchet thereon, a slidably mounted locking pawl for holding the ratchet against rotation by the spring, and means pivoted on the pawl and engaged by one face of the ratchet to hold the pawl out of operative position together with a reel on the shaft.

3. In combination, a spring rotated shaft, a double ratchet carried by said shaft, a slidably mounted locking pawl adapted to engage one face of the ratchet to lock the shaft against rotation by the spring, and a tripping pawl pivoted to the locking pawl and adapted to engage the other face of the ratchet to raise and hold the locking pawl out of operative engagement with the ratchet together with a reel on the shaft.

4. In combination, a spring rotated shaft, a double face ratchet wheel thereon, a locking pawl to engage one face of the ratchet to hold the ratchet against rotation by the spring, and a beveled tripping pawl carried by the locking pawl and engaged by the other face of the ratchet wheel to trip the locking pawl out of engagement with the ratchet wheel, the beveled portion of the tripping pawl causing the same to be idly engaged by the other face of the ratchet wheel after being operated to raise the locking pawl together with a reel on the shaft.

In testimony whereof I affix my signature in presence of two witnesses.

BENJAMIN F. MILLER.

Witnesses:
Geo. G. Miller,
Sarah W. Boyle.